US012782562B2

(12) United States Patent
Wang et al.

(10) Patent No.: US 12,782,562 B2
(45) Date of Patent: Nov. 3, 2026

(54) OPTICAL SENSING SYSTEM AND METHOD FOR ELIMINATING MISJUDGMENT OF REFLECTIVE LIGHTS

(71) Applicant: PIXART IMAGING INC., Hsin-Chu (TW)

(72) Inventors: Guo-Zhen Wang, Hsin-Chu (TW); Tse-En Peng, Hsin-Chu (TW)

(73) Assignee: PIXART IMAGING INC., Hsin-Chu (TW)

( * ) Notice: Subject to any disclaimer, the term of this patent is extended or adjusted under 35 U.S.C. 154(b) by 311 days.

(21) Appl. No.: 18/656,814

(22) Filed: May 7, 2024

(65) Prior Publication Data

US 2024/0288580 A1 Aug. 29, 2024

Related U.S. Application Data

(63) Continuation-in-part of application No. 18/418,767, filed on Jan. 22, 2024, now Pat. No. 12,164,028, and (Continued)

(51) Int. Cl.
*G01S 17/08* (2006.01)
*G01S 7/497* (2006.01)
(Continued)

(52) U.S. Cl.
CPC .............. *G01S 17/08* (2013.01); *G01S 7/497* (2013.01); *G01S 17/04* (2020.01); *G05D 1/0238* (2013.01); *G05D 1/628* (2024.01)

(58) Field of Classification Search
CPC .................. G01S 17/931; G01S 7/497; G01S 2007/4977; G01S 13/865; G01S 13/867;
(Continued)

(56) References Cited

U.S. PATENT DOCUMENTS 10,360,684 B2 7/2019 Seitz et al.
10,609,862 B2 4/2020 Wu et al.
(Continued)

FOREIGN PATENT DOCUMENTS

CN 101981437 A 2/2011
CN 105361817 A 3/2016
(Continued)

*Primary Examiner* — Courtney Joan Nelson
(74) *Attorney, Agent, or Firm* — Li & Cai Intellectual Property (USA) Office

(57) ABSTRACT

An optical system and a method for eliminating misjudgment of reflective lights are provided. The method includes: emitting a detection light by a light source; receiving reflective light signals by a light sensor; and configuring a processing circuit to: generate a characteristic pattern according to the reflective light signals received by the light sensor; analyze the characteristic pattern and determine whether or not the characteristic pattern includes a plurality of sub-patterns; in response to determining that the characteristic pattern includes the plurality of sub-patterns, compare positions of the sub-patterns with a reference position of a reference pattern; and select the sub-pattern having the position that is closest to the reference position to determine whether an object is present in a detection range and eliminate misjudgment caused by the reflective lights.

20 Claims, 16 Drawing Sheets

Related U.S. Application Data a continuation-in-part of application No. 18/381,108, filed on Oct. 17, 2023, now Pat. No. 12,036,668, said application No. 18/418,767 is a continuation of application No. 17/535,108, filed on Nov. 24, 2021, now Pat. No. 11,921,205, which is a continuation-in-part of application No. 17/102,558, filed on Nov. 24, 2020, now Pat. No. 11,826,906, said application No. 18/381,108 is a continuation of application No. 17/102,558, filed on Nov. 24, 2020, now Pat. No. 11,826,906.

(51) Int. Cl.

| | |
|---|---|
| ***G01S 17/04*** | (2020.01) |
| ***G05D 1/00*** | (2024.01) |
| ***G05D 1/628*** | (2024.01) |

(58) Field of Classification Search

CPC ........ G01S 13/931; G01S 17/08; G01S 17/04; G01S 17/46; G01S 2013/93277; G01S 7/4808; G05D 1/0238; G05D 1/0088; G05D 1/0242; G05D 1/0248; G05D 1/0231; G05D 1/628; G06V 20/10; G06V 20/58; G06V 10/25; G06V 20/56; G06T 7/74; G06T 7/521; B60R 11/04; B60R 2011/004; B60R 2300/301; B60R 2300/8093; A47L 2201/04; A47L 9/2805; A47L 11/4069; A47L 2201/00

See application file for complete search history.

(56) References Cited

U.S. PATENT DOCUMENTS

| | | | | |
|---|---|---|---|---|
| 11,719,817 | B2 | 8/2023 | Noguchi et al. | |
| 11,982,805 | B2 | 5/2024 | Hwangbo et al. | |
| 2002/0093342 | A1 | 7/2002 | Ivanov et al. | |
| 2016/0320777 | A1 * | 11/2016 | Yun | A47L 11/4011 |
| 2018/0014709 | A1 | 1/2018 | O'Brien et al. | |
| 2018/0089847 | A1 | 3/2018 | Lee et al. | |
| 2018/0246518 | A1 | 8/2018 | Vogel et al. | |
| 2019/0220025 | A1 | 7/2019 | Chen et al. | |
| 2019/0220033 | A1 * | 7/2019 | Cho | G05D 1/0225 |
| 2020/0170470 | A1 | 6/2020 | Liggett et al. | |
| 2020/0386873 | A1 | 12/2020 | Kudla et al. | |
| 2022/0163666 | A1 | 5/2022 | Wang | |
| 2022/0184811 | A1 | 6/2022 | Park et al. | |

FOREIGN PATENT DOCUMENTS

| | | | |
|---|---|---|---|
| CN | 107101589 | A | 8/2017 |
| CN | 107305386 | A | 10/2017 |
| CN | 107847098 | A | 3/2018 |
| CN | 106239504 | B | 5/2019 |
| CN | 210464466 | U | 5/2020 |
| CN | 212089442 | U | 12/2020 |
| DE | 102016107900 | A1 | 11/2017 |
| JP | 202070121 | A | 5/2020 |
| KR | 1020200114860 | A | 10/2020 |
| WO | WO 2016045593 | A1 | 3/2016 |
| WO | WO 2019116549 | A1 | 6/2019 |
| WO | WO 2019181691 | A1 | 9/2019 |
| WO | WO 2020213955 | A1 | 10/2020 |

* cited by examiner

OPTICAL SENSING SYSTEM AND METHOD FOR ELIMINATING MISJUDGMENT OF REFLECTIVE LIGHTS

CROSS-REFERENCE TO RELATED PATENT APPLICATION

This application is a continuation-in-part of U.S. application Ser. No. 18/418,767, filed on Jan. 22, 2024 and entitled "OPTICAL SENSING SYSTEM," and U.S. application Ser. No. 18/381,108, filed on Oct. 17, 2023 and entitled "METHOD FOR ELIMINATING MISJUDGMENT OF REFLECTIVE LIGHT AND OPTICAL SENSING SYSTEM," the entire disclosures of which are incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an optical sensing system and a method for improving judgment made by the optical sensing system, and more particularly to an optical sensing system and a method for eliminating misjudgment of reflective lights that are sensed by the optical sensing system.

BACKGROUND OF THE DISCLOSURE

A conventional autonomous robot may include a sensor for detecting obstacles on the floor of the house and can plan a route by robotics technology in order to navigate around the house. When the autonomous robot automatically navigates in an area, one of the most important tasks is to avoid obstacles on its navigation path.

Various conventional sensors can be used in the autonomous robot for detecting the obstacles. For example, a light sensor can be used to detect the obstacles by sensing detection lights emitted by a light source when the detection light is reflected by the obstacle on the navigation path.

In the current method to avoid incorrect judgments, a sequence of steps is followed to detect obstacles. This involves storing and comparing two frames with distinct patterns, one from the past and one from the present in memory. Such a comparison helps identify genuine reflective signals in the current frame. However, if the previous frame has errors due to secondary reflections, it can lead to inaccuracies in identifying real reflective signals in the current frame. Additionally, this method requires substantial storage space.

SUMMARY OF THE DISCLOSURE

In response to the above-referenced technical inadequacies, the present disclosure provides a method for eliminating misjudgment of reflective lights and an optical sensing system.

In order to solve the above-mentioned problems, one of the technical aspects adopted by the present disclosure is to provide a method for eliminating misjudgment of reflective lights, and the method includes: emitting a detection light by a light source; receiving reflective light signals by a light sensor; and configuring a processing circuit to: generate a characteristic pattern according to the reflective light signals received by the light sensor; analyze the characteristic pattern and determine whether or not the characteristic pattern includes a plurality of sub-patterns; in response to determining that the characteristic pattern includes the plurality of sub-patterns, compare positions of the sub-patterns with a reference position of a reference pattern; and select the sub-pattern having the position that is closest to the reference position to determine whether an object possesses and eliminate misjudgment caused by the reflective lights.

In order to solve the above-mentioned problems, another one of the technical aspects adopted by the present disclosure is to provide an optical sensing system, which includes: a light source configured to emit a detection light, a light sensor configured to receive reflective light signals; and a processing circuit. The processing circuit is configured to: generate a characteristic pattern according to the reflective light signals received by the light sensor; analyze the characteristic pattern and determine whether or not the characteristic pattern includes a plurality of sub-patterns; in response to determining that the characteristic pattern includes the plurality of sub-patterns, compare positions of the sub-patterns with a reference position of a reference pattern; and select the sub-pattern having the position that is closest to the reference position to determine whether an object presents in a detection range while eliminating misjudgment of reflective lights.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
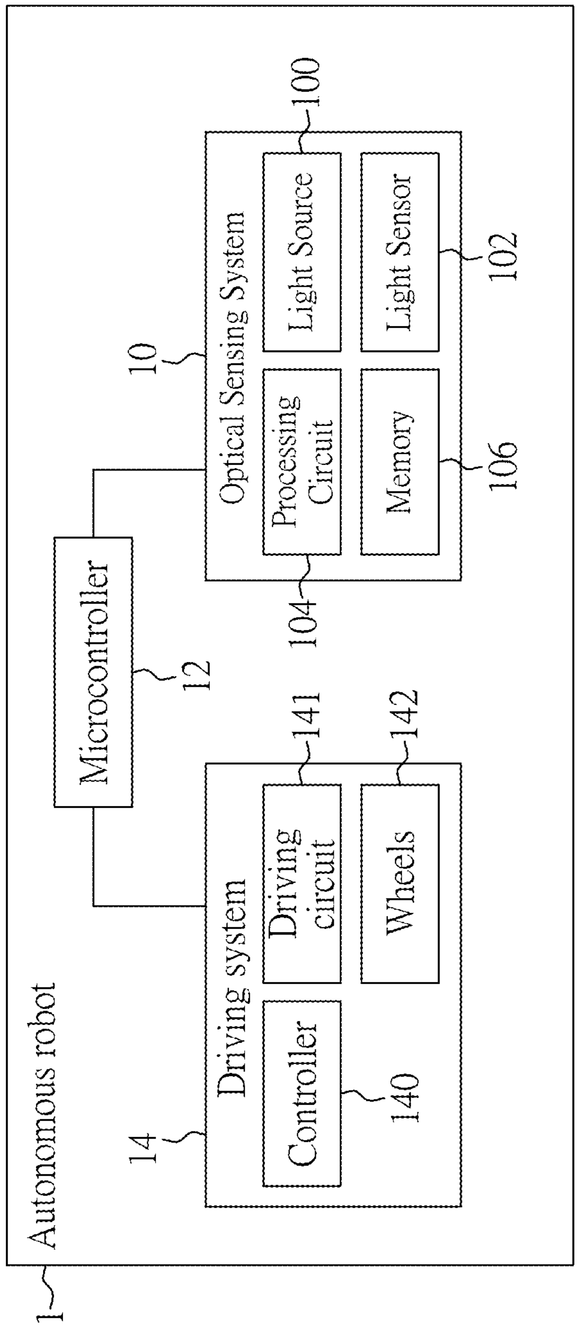
FIG. 1 is a block diagram of an autonomous robot that includes an optical system according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

FIG. 1 is a block diagram of an autonomous robot that includes an optical system according to one embodiment of the present disclosure.

Reference can be made to FIG. 1. The present disclosure provides an optical sensing system 10, which includes a light source 100, a light sensor 102, a processing circuit 104, and a memory 106.

The processing circuit 104 is, for example, a central processing unit (CPU), or other programmable general-purpose or special-purpose microprocessor, digital signal processor (DSP), programmable controllers, application-specific integrated circuits (ASIC), a programmable logic device (PLD), a graphics processing unit (GPU), other similar devices, or a combination of these devices. The processing circuit 104 can execute program codes, software modules, instructions, and the like that are recorded in the memory 106 to implement the method for eliminating misjudgment of reflective lights sensed by the optical sensing system of the embodiment of the present disclosure.

The memory 106 can be any type of fixed or removable random-access memory (RAM), read-only memory (ROM), flash memory, hard disks or other similar devices, integrated circuits and combinations thereof.

Specifically, the present disclosure is related to an optical sensing system and a method for eliminating misjudgment of reflective lights from highly reflective environment or caused by secondary reflections. According to one concept the present disclosure, the misjudgment can be eliminated by comparing multiple sub-patterns included in a characteristic pattern obtained from reflected linear light with a reference pattern and selecting the sub-pattern that is closest to the reference pattern.

Furthermore, as shown in FIG. 1, the optical sensing system 10 can be provided in an autonomous robot 1. The autonomous robot 1 can be a cleaning machine, such as a robotic vacuum cleaning device, which uses the optical sensing system 10 to detect and circumvent obstacles in its path to reach a predefined destination.

Figure 2:
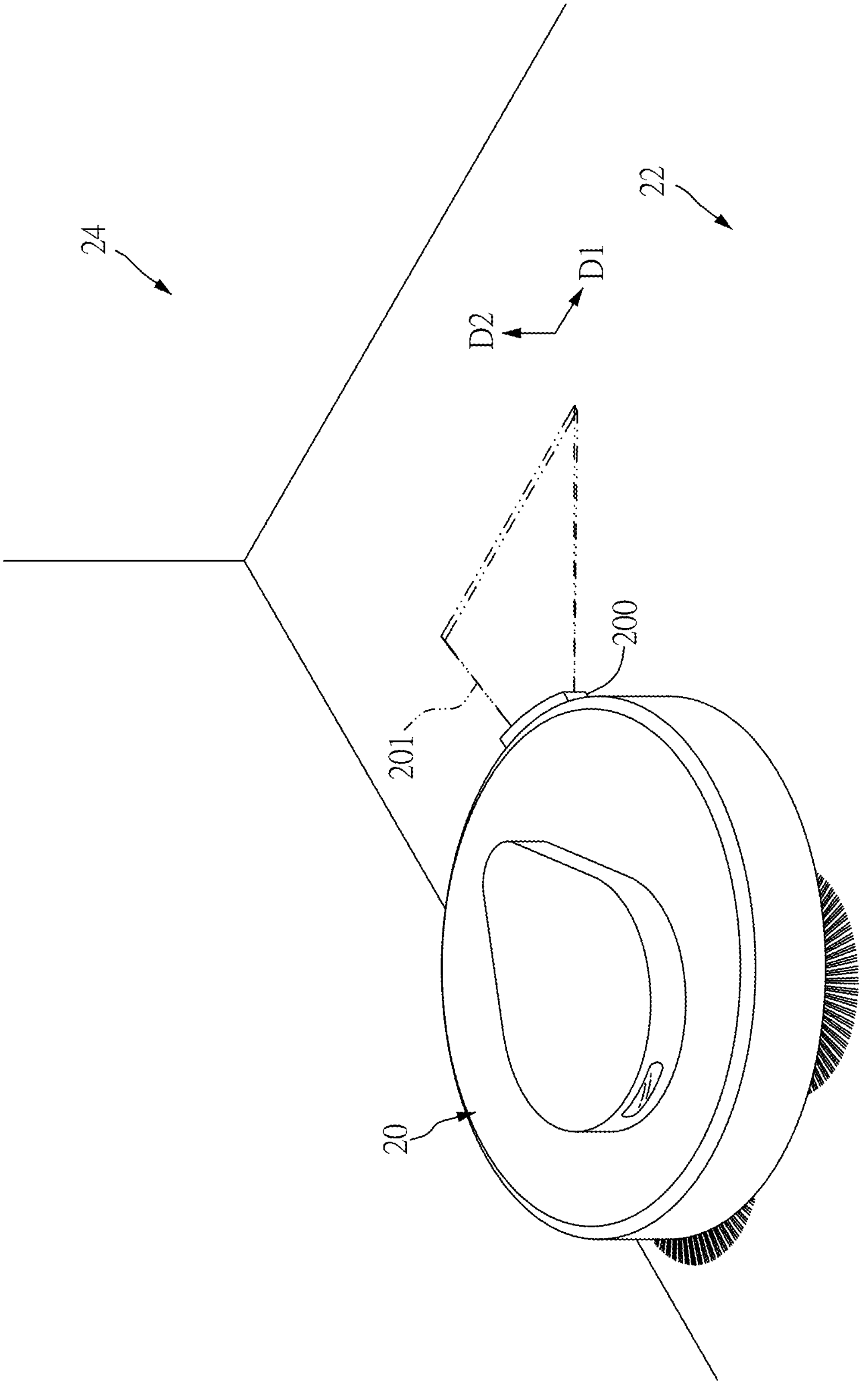
FIG. 2 is a schematic diagram illustrating an autonomous robot emitting a linear light to detect any object ahead of the autonomous robot according to one embodiment of the disclosure.

Reference can be further made to FIG. 2, which is a schematic diagram illustrating an autonomous robot emitting a linear light to detect any object ahead of the autonomous robot according to one embodiment of the disclosure.

As shown in FIG. 2, the light source 100 can be a light emitting device that includes one or more light bulbs or light emitting diodes, and can be disposed in a light sensor module 200 to emit a linear light 201 onto the floor 22. The light sensor module 200 also includes the light sensor 106 used to receive the reflected lights (e.g., by an object, the floor 22 and/or the wall 24). In some embodiments, the autonomous robot 20 can be driven to make a detour in order to avoid colliding with the wall 24 or any obstacle.

Reference is made to FIG. 1 again, the autonomous robot 1 further includes a microcontroller 12 and a driving system 14. The microcontroller 12 is electrically connected to other circuit systems for performing functions of the autonomous robot 10. The autonomous robot 1 can include the optical sensing system 10, a driving system 14, and optionally, a cleaning system, or the autonomous robot 1 with the driving system 14 can be included in the optical sensing system 10, and the present disclosure is not limited thereto.

The driving system 14 includes a controller 140 that controls a driving circuit 141 to drive the autonomous robot 1 to move or rotate through using wheels 142, e.g., a kind of omni-directional wheels, and the controller 140, the driving circuit 141 and the wheels 142 can also be controlled by the processor 108 directly, and the present disclosure is not limited thereto.

Figure 3:
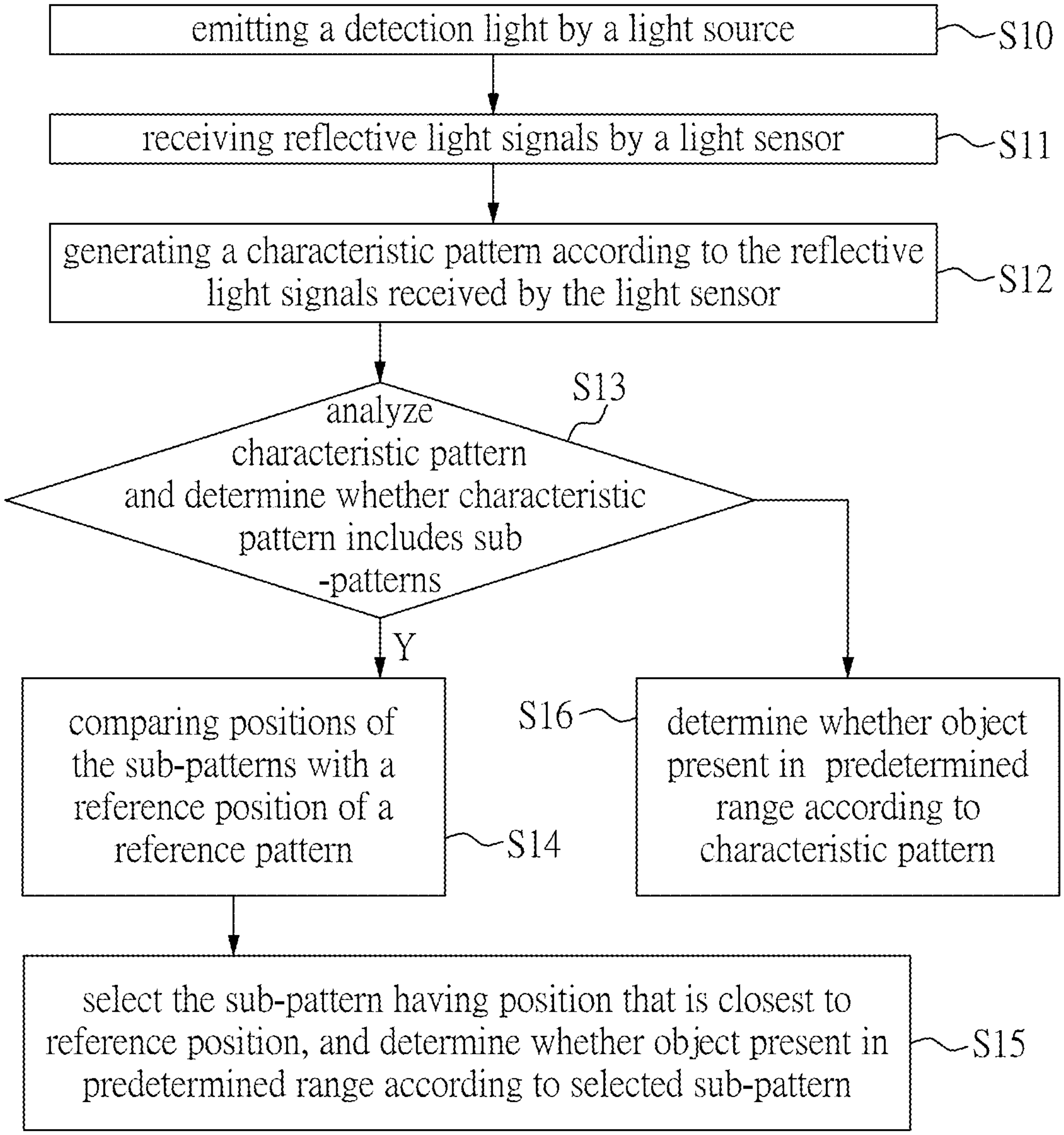
FIG. 3 is a flowchart of a method for eliminating misjudgment of reflective lights according to one embodiment of the present disclosure.

Reference can be further made to FIG. 3, which is a flowchart of a method for eliminating misjudgment of reflective lights according to one embodiment of the present disclosure. The method for eliminating misjudgment of reflective lights can be performed by the optical sensing system 10 mentioned above. The method can include the following steps:

Step S10: emitting a detection light by a light source.

Step S11: receiving reflective light signals by a light sensor.

Figure 4:
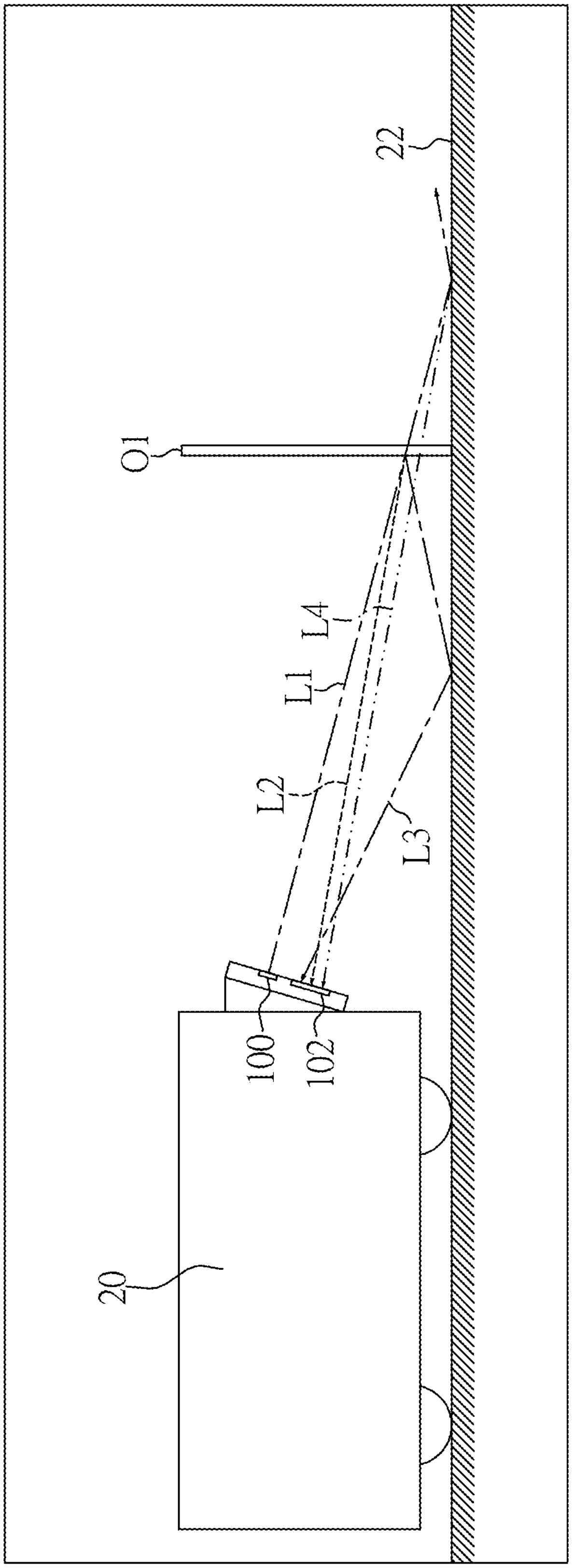
FIG. 4 is a side view schematically showing that the linear light emitted from the autonomous robot according to one embodiment of the present disclosure.

FIG. 4 is a side view schematically showing that the linear light emitted from the autonomous robot according to one embodiment of the present disclosure. As shown, the light sensor module 200 has a configuration in which the light source 100 is located above the light sensor 102. The light sensor module 200 is tilted by a predetermined angle, such that both of the light source 100 and the light sensor 102 are tilted and face downward to the floor 22. The light source 100 can emit a linear light L1 to the floor 22 along a predetermined direction, and an acute angle can be formed between the predetermined direction and the floor 22. After the linear light L1 reaches an object O1, a real reflective light L2 and a secondary reflective light L3 are generated. If the object O1 does not exist, the linear light L1 will pass through the object O1 (which is assumed to be transparent) and reaches the floor 22, so as to generated an imaginary ground reflective light L4. The real reflective light L2, the secondary reflective light L3 and the ground reflective light L4 are all assumed to be received by the light sensor 102.

The processing circuit 104 can be configured to perform the following steps:

Step S12: generating a characteristic pattern according to the reflective light signals received by the light sensor.

Figure 5B:
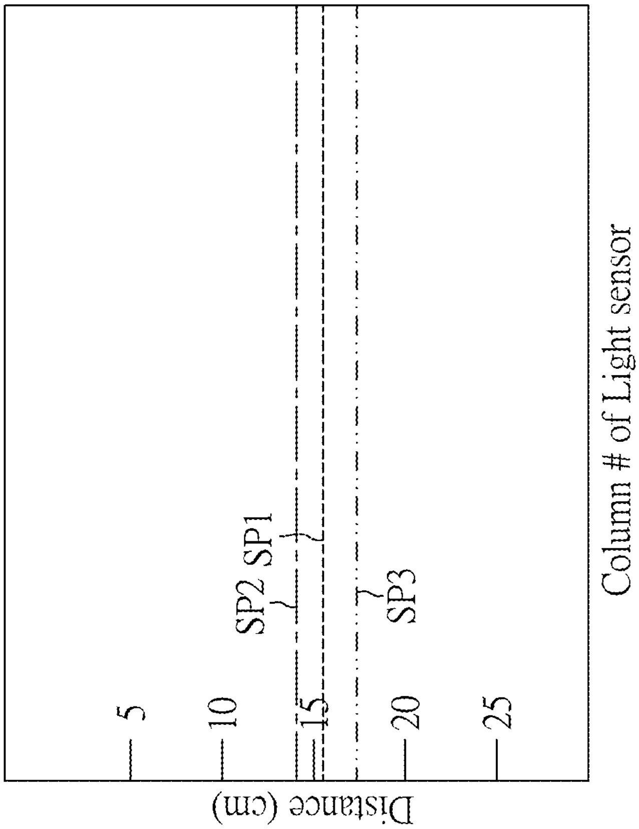
FIG. 5B is a schematic diagram showing a characteristic pattern obtained from the light patterns by the processing circuit according to one embodiment of the present disclosure.
Figure 5A:
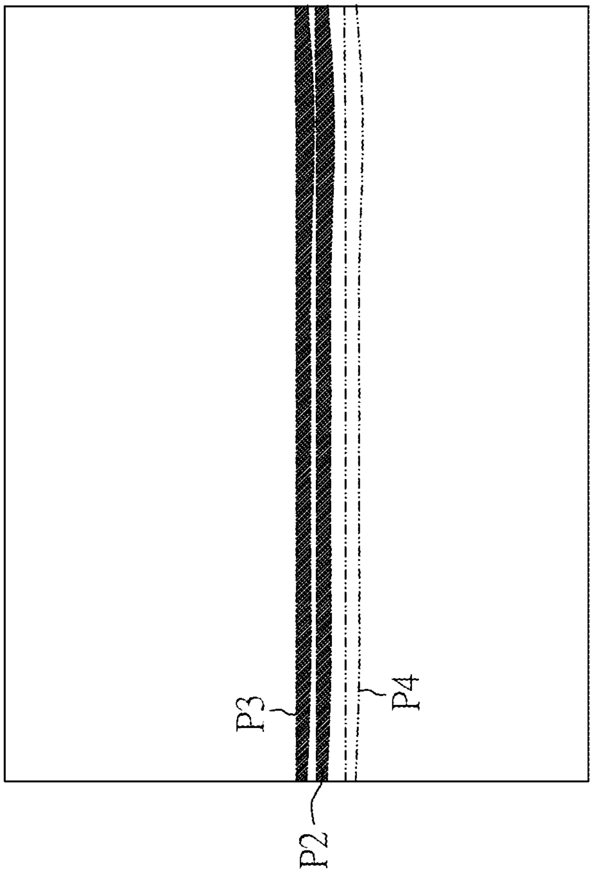
FIG. 5A is a schematic diagram showing light patterns respectively corresponding to the real reflective light, the secondary reflective light and the ground reflective light that can be seen by the light sensor according to one embodiment of the present disclosure.

FIG. 5A is a schematic diagram showing light patterns respectively corresponding to the real reflective light, the secondary reflective light and the ground reflective light that can be seen by the light sensor according to one embodiment of the present disclosure. FIG. 5B is a schematic diagram showing a characteristic pattern obtained from the light patterns by the processing circuit according to one embodiment of the present disclosure. As shown in FIG. 5A, light patterns P2, P3 and P4 respectively correspond to the real reflective light L2, the secondary reflective light L3 and the ground reflective light L4. The lights reflected by the highly-reflective object O1 may generate the secondary reflective light L3, which may cause a misjudgment and a false alarm if the light pattern P3 is used to determine a distance of the object O1 relative to the autonomous robot 20.

More specifically, the light sensor 100 can include a plurality of sensor units arranged in a matrix having a plurality of columns and rows. For each column of the matrix, a plurality of light intensities can be generated by corresponding ones of the sensor units. For example, a first row of the sensor units can be configured to generate the light intensities for the first column of the light sensor 102 according to the lights received therefrom.

Moreover, one or more peak values can be further obtained from the light intensities, and a column pattern of gravity for each column of the matrix can be generated according to the one or more peak values.

In an example, for the first column, a maximum value of the light intensities of the first column is found and marked as one peak value, and a predetermine range is set according to the maximum value. For instance, a predetermined quantity of the light intensities adjacent to the light intensity corresponding to the maximum value are filtered out, and whether another one of the peak value presents in the rest of the light intensities is further determined.

Taking the light patterns P2 and P3 shown in FIG. 5A as an example, two peak values will be found in the first column (the leftmost column) of the light intensities generated by the light sensor, therefore, two points representing the two peak value will be generated as the column pattern of gravity for the first column. That is, the characteristic pattern with multiple peaks can be obtained.

After another one of the peak value is found and is not within the predetermined range, the above steps can be repeatedly performed until no more peak value can be found, and all of the obtained peak values can be represented by discrete points, so as to generate the column pattern of gravity for each column.

Afterward, multiple ones of the column pattern of gravity can be combined to generate the characteristic pattern. As shown in FIG. 5B, the characteristic pattern including sub-patterns SP1 and SP2 can be obtained from the light patterns P2 and P3. In a case that the ground reflective light L4 is received by the light sensor 102, a sub-pattern SP3 can be obtained from the light pattern P4 corresponding to the ground reflective light L4.

The method proceeds to step S13: analyze the characteristic pattern and determine whether or not the characteristic pattern includes a plurality of sub-patterns. More specifically, when multiple sub-patterns appear in the characteristic pattern, it means that certain sub-patterns that may cause misjudgments need to be filtered and eliminated.

In response to determining that the characteristic pattern includes the plurality of sub-patterns, the method proceeds to step S14: comparing positions of the sub-patterns with a reference position of a reference pattern.

Step S15: select the sub-pattern having the position that is closest to the reference position, and determine whether an object present in a detection range according to the selected sub-pattern.

It should be noted that, since a relationship among the light patterns P2, P3, and P4 correspond to a relationship among the sub-pattern SP1, SP2 and SP3, the sub-pattern SP3 can be used as a reference pattern for determining which of the sub-pattern SP1 and SP2 is caused by the secondary reflective light L3. That is, one of the sub-pattern SP1 and SP2 that is closest to the reference pattern (i.e., sub-pattern SP3) can be determined as corresponding to the real reflective light L2, and the other can be determined as corresponding to the secondary reflective light L3.

Therefore, in the case shown in FIG. 5B, the sub-pattern SP1 having the position that is closest to a reference position of the reference pattern (sub-pattern SP3), and determine whether an object presents in the detection range of the autonomous robot 20 according to the selected sub-pattern SP1. In addition, a position and/or a distance of the object O1 can also be determined according to the selected sub-pattern SP1.

Figure 6:
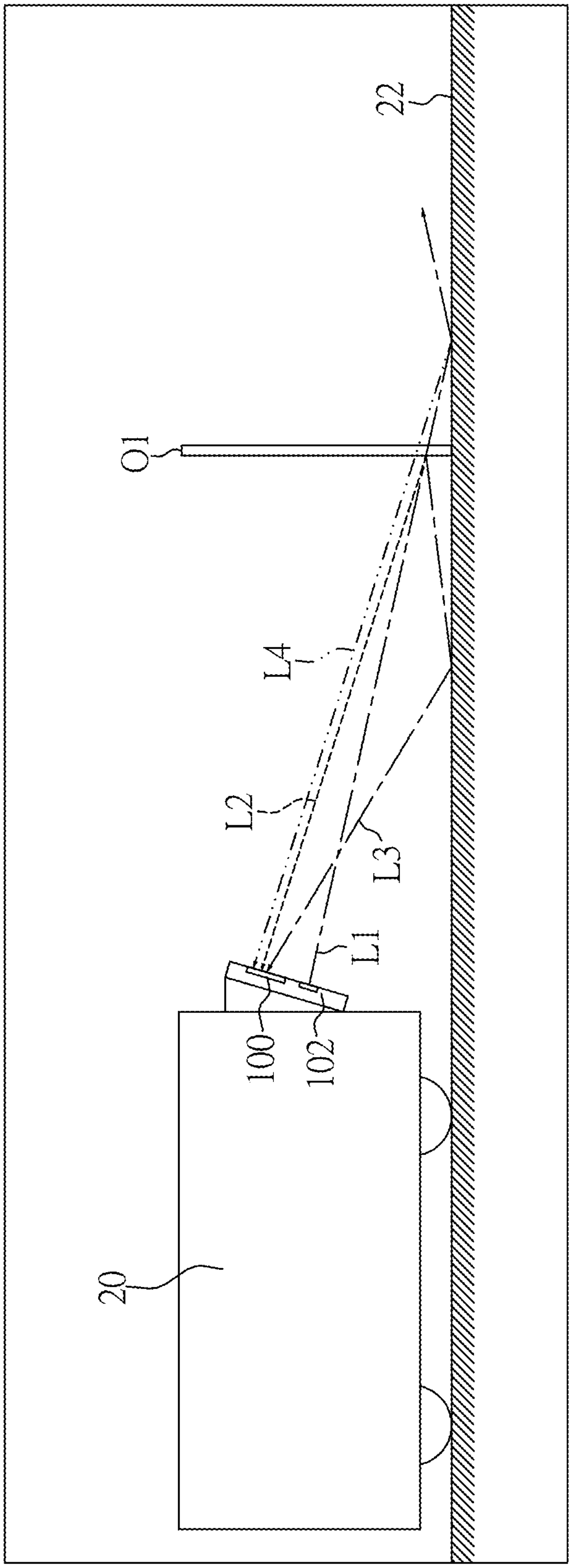
FIG. 6 is a side view schematically showing that the linear light emitted from the autonomous robot according to another embodiment of the present disclosure.
Figure 7B:
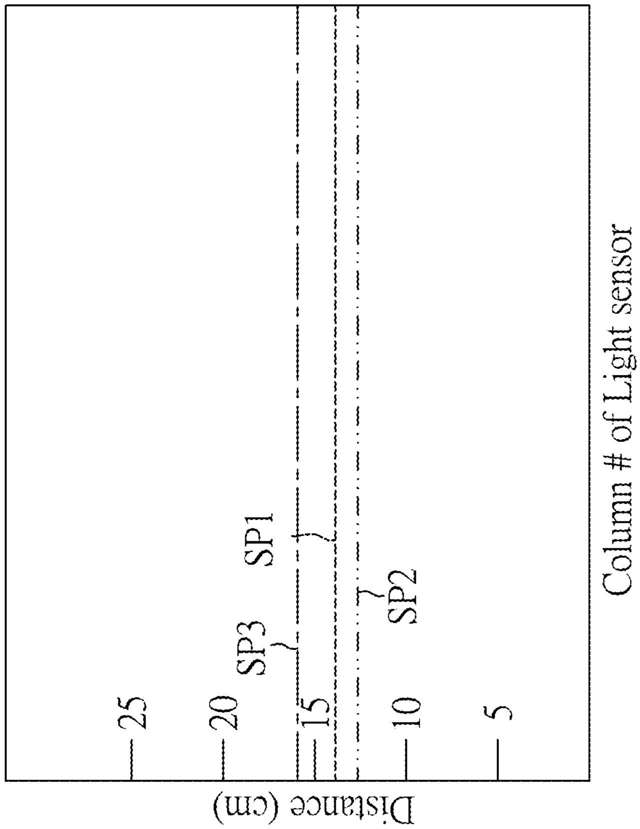
FIG. 7B is a schematic diagram showing a characteristic pattern obtained from the light patterns by the processing circuit according to another embodiment of the present disclosure.
Figure 7A:
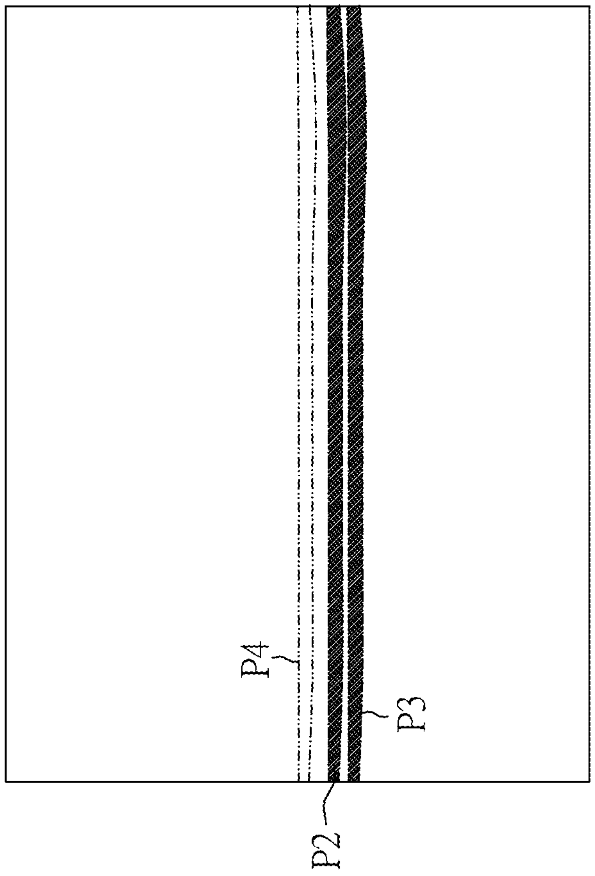
FIG. 7A is a schematic diagram showing light patterns respectively corresponding to the real reflective light, the secondary reflective light and the ground reflective light that can be seen by the light sensor according to another embodiment of the present disclosure.

Reference can be further made to FIGS. 6, 7A and 7B. FIG. 6 is a side view schematically showing that the linear light emitted from the autonomous robot according to another embodiment of the present disclosure. FIG. 7A is a schematic diagram showing light patterns respectively corresponding to the real reflective light, the secondary reflective light and the ground reflective light that can be seen by the light sensor according to another embodiment of the present disclosure. FIG. 7B is a schematic diagram showing a characteristic pattern obtained from the light patterns by the processing circuit according to another embodiment of the present disclosure.

As shown, the light sensor module 200 has a configuration in which the light source 100 is located below the light sensor 102. The light sensor module 200 is tilted by a predetermined angle, such that both of the light source 100 and the light sensor 102 are tilted and face downward to the floor 22. The real reflective light L2, the secondary reflective light L3 and the ground reflective light L4 are all assumed to be received by the light sensor 102.

As shown in FIGS. 7A and 7B, the light patterns P2, P3 and P4 respectively correspond to the real reflective light L2, the secondary reflective light L3 and the ground reflective light L4. The lights reflected by the highly-reflective object O1 may generate the secondary reflective light L3, which may cause a misjudgment and a false alarm if the light pattern P3 is used to determine a distance of the object O1 relative to the autonomous robot 20.

Therefore, by performing the steps S10, S11 and S12, the characteristic pattern including sub-patterns SP1 and SP2 can be obtained from the light patterns P2 and P3. In the case that the ground reflective light L4 is received by the light sensor 102, a sub-pattern SP3 can be obtained from the light pattern P4 corresponding to the ground reflective light L4.

Furthermore, one of the sub-pattern SP1 and SP2 that is closest to the reference pattern (i.e., sub-pattern SP3) can be determined as corresponding to the real reflective light L2, and the other can be determined as corresponding to the secondary reflective light L3.

Similarly, the sub-pattern SP1 having the position that is closest to a reference position of the reference pattern (sub-pattern SP3) is selected, and the selected sub-pattern SP1 is further used to determine whether the object present in the detection range.

Therefore, the method for eliminating misjudgment of the reflective lights provided by the present disclosure can be applied to the light sensor modules with different configurations, without being confused by the light pattern caused by multiple reflection lights.

In response to determining that the characteristic pattern does not include the plurality of sub-patterns in step S13, the method proceeds to step S16: determine whether an object present in the detection range according to the characteristic pattern.

It can be understood that, if there is only one sub-pattern appear in the characteristic pattern, the characteristic pattern can be directly used for obstacle detection or avoidance.

Figure 8:
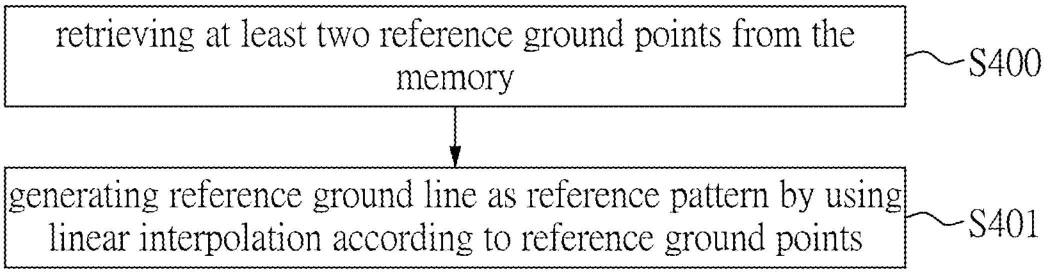
FIG. 8 is another flowchart of the method for eliminating misjudgment of the reflective lights according to the present disclosure.

Reference can be made to FIG. 8, which is another flowchart of the method for eliminating misjudgment of the reflective lights according to the present disclosure. Before the step of comparing the characteristic pattern with the reference pattern (Step S14) is performed, the method further includes:

Step S20: retrieving at least two reference ground points from the memory.

Step S21: generating a reference ground line as the reference pattern by using a linear interpolation according to the at least two reference ground points.

Specifically, for saving data usage for the method provided by the present disclosure, the above-mentioned steps S20 and S21 are executed, such that only a few data points need to be stored and retrieved during the process of eliminating misjudgments, instead of storing the entire image or the data of each column for the reference pattern.

As shown in FIG. 5A or 7A, since the light pattern corresponding to the ground reflective light L4 is established by the linear light, it is conceivable that the reference pattern, represented by a ground line, presents in a form of a straight line, thereby providing a basis for performing the interpolation method.

Figure 9:
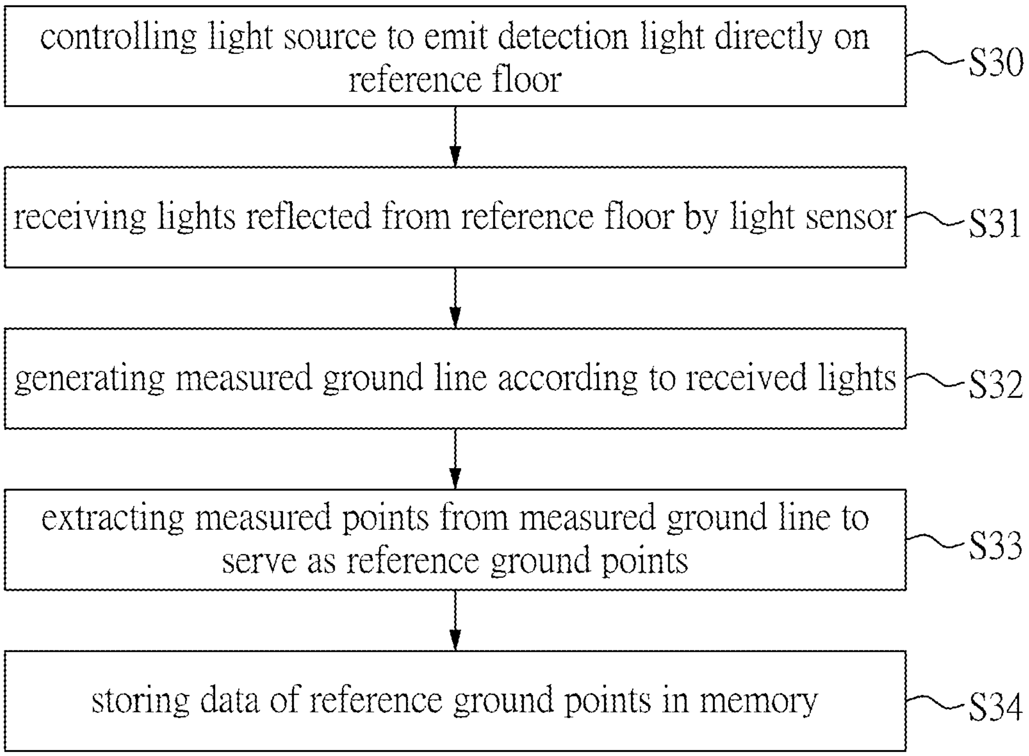
FIG. 9 is a flowchart of a calibration process according to one embodiment of the present disclosure.

FIG. 9 is a flowchart of a calibration process according to one embodiment of the present disclosure. Reference is further made to FIG. 9, in the method for eliminating misjudgments of reflective lights provided by the present disclosure, the processing circuit 104 is further configured to perform a calibration process to obtain the at least two reference ground points, and the calibration process includes:

Step S30: controlling the light source to emit the detection light directly on a reference floor.

Step S31: receiving lights reflected from the reference floor by the light sensor.

Figure 10:
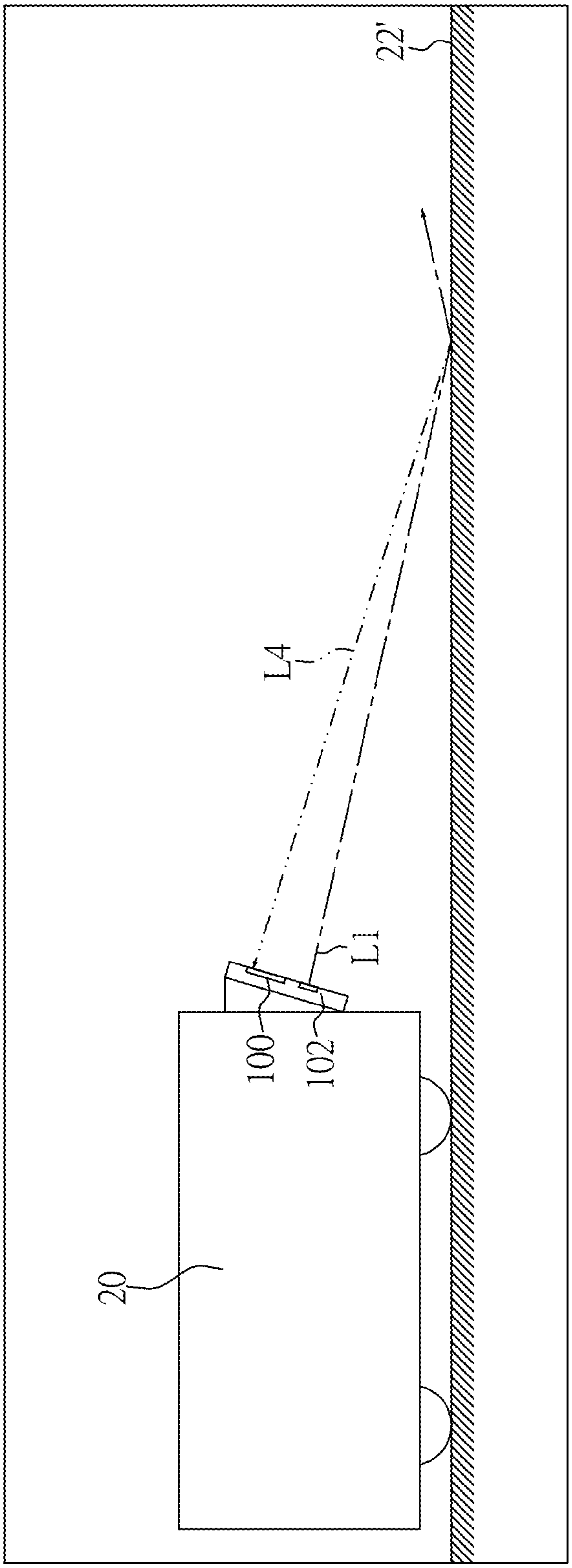
FIG. 10 is a side view showing a configuration of a calibration process according to one embodiment of the present disclosure.

Reference is further made to FIG. 10, which is a side view showing a configuration of a calibration process according to one embodiment of the present disclosure.

As shown, the light sensor module 200 has a configuration in which the light source 100 is located below the light sensor 102. The light sensor module 200 is tilted by a predetermined angle, such that both of the light source 100 and the light sensor 102 are tilted and face downward to a reference floor 22', and a material of the reference floor 22' can be specifically selected, such as a material with high reflectivity, so as to establish a predetermined environment in which secondary reflective lights may be generated. The light source 100 can emit the linear light L1 to the reference floor 22 along a predetermined direction, and an acute angle can be formed between the predetermined direction and the reference floor 22. After the linear light L1 reaches the reference floor 22, a ground reflective light L4 is generated and reflected back to the light sensor 102.

Step S32: generating a measured ground line according to the received lights.

Step S33: extracting at least two measured points from the measured ground line to serve as the at least two reference ground points.

Step S34: storing data of the at least two reference ground points in the memory.

Figure 11A:
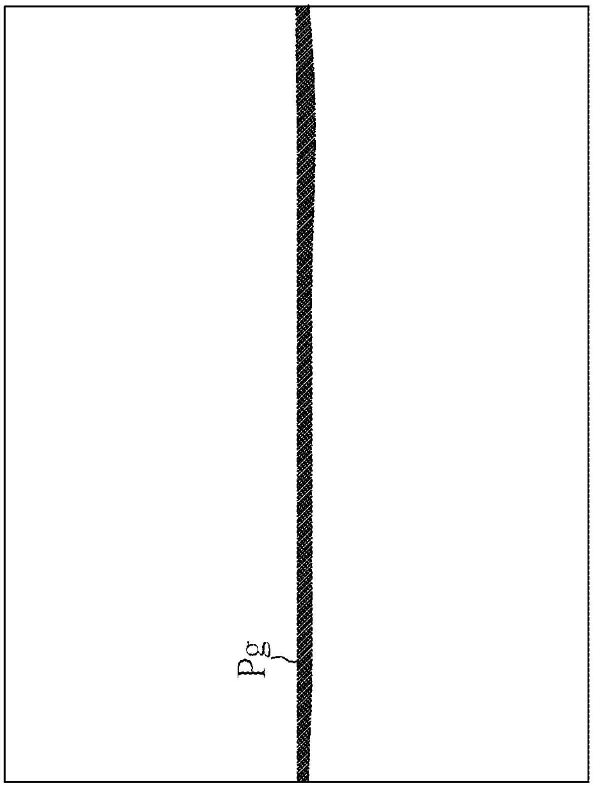
FIG. 11A is a schematic diagram showing a light pattern corresponding to the ground reflective light that can be seen by the light sensor according to one embodiment of the present disclosure.
Figure 11B:
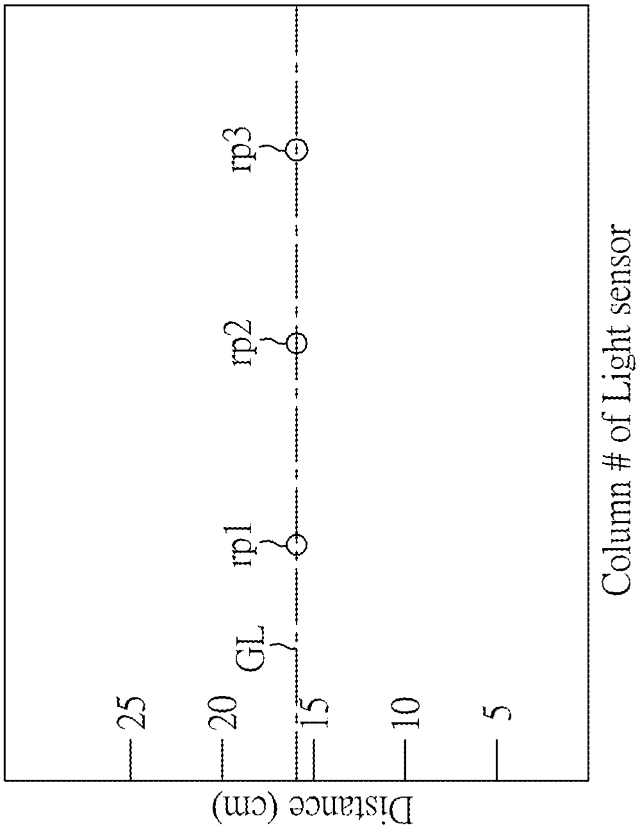
FIG. 11B is a schematic diagram showing a reference pattern and extracted reference ground points according to one embodiment of the present disclosure.

FIG. 11A is a schematic diagram showing a light pattern corresponding to the ground reflective light that can be seen by the light sensor according to one embodiment of the present disclosure. FIG. 11B is a schematic diagram showing a reference pattern and extracted reference ground points according to one embodiment of the present disclosure.

As shown in FIGS. 11A and 11B, the measured ground line GL corresponding to a light pattern Pg can be obtained according light intensities obtained by the light sensor 102, and the measured ground line GL is a pattern combined by multiple ones of the column pattern of gravity, which can be obtained by the peak-finding method mentioned above. The measured ground line GL can serve as the reference pattern having the reference position, and measured points rp1, rp2 and rp3 can be extracted from the measured ground line GL to serve as the reference ground points and are stored in the memory 106.

Therefore, by performing the calibration process, only a few data points need to be stored and retrieved during the process of eliminating misjudgments, instead of storing the entire image or the data of each column for the reference pattern, and the method for eliminating misjudgment of reflective lights provided by the present disclosure can be implemented without using a line-buffer or a frame-buffer.

Figure 12:
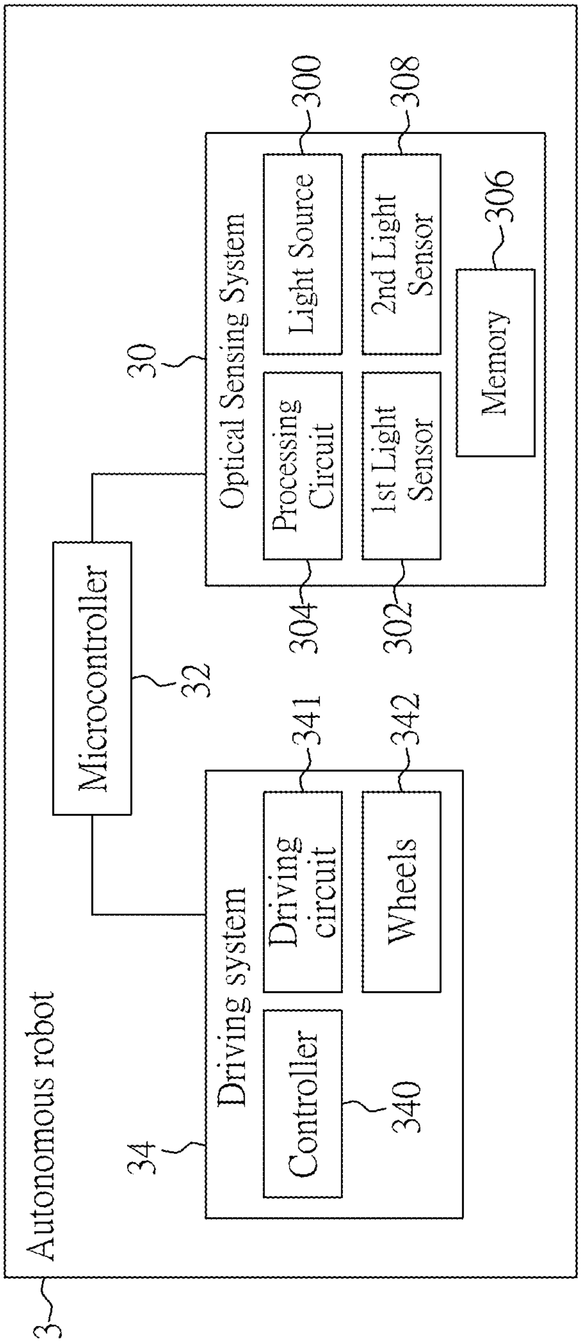
FIG. 12 is a block diagram of an autonomous robot that includes an optical system according to another embodiment of the present disclosure.

FIG. 12 is a block diagram of an autonomous robot that includes an optical system according to another embodiment of the present disclosure. In the present embodiment, the same or similar devices are denoted by similar reference numerals as those in the previous embodiments. Some devices illustrated in the previous embodiments may be omitted, and descriptions of those omitted devices can be referred to the previous embodiments. Main difference between the present embodiment and the previous embodiment is illustrated below.

The embodiment shown in FIG. 12 of the present disclosure provides an optical sensing system 30, which includes a light source 300, a first light sensor 302, a processing circuit 304, a memory 306, and a second light sensor 308.

The light source 300 can be a light emitting device that includes one or more light bulbs or light emitting diodes, and can be used to emit a linear light along a direction that is substantially parallel to the floor. The first light sensor 302 and the second light sensor 308 are used to receive the reflected lights (e.g., by an object, the floor and/or the wall).

More specifically, the first light sensor 302 and the second light sensor 308 are separately arranged to capture distance information of the light source 300. Since the positions of the first light sensor 302 and the second light sensor 308 are different, positions caused by the reflected lights can also be different, and such an optical characteristic can be used to distinguish a primary pattern of a real object from secondary patterns caused by multiple reflection lights.

Figure 13:
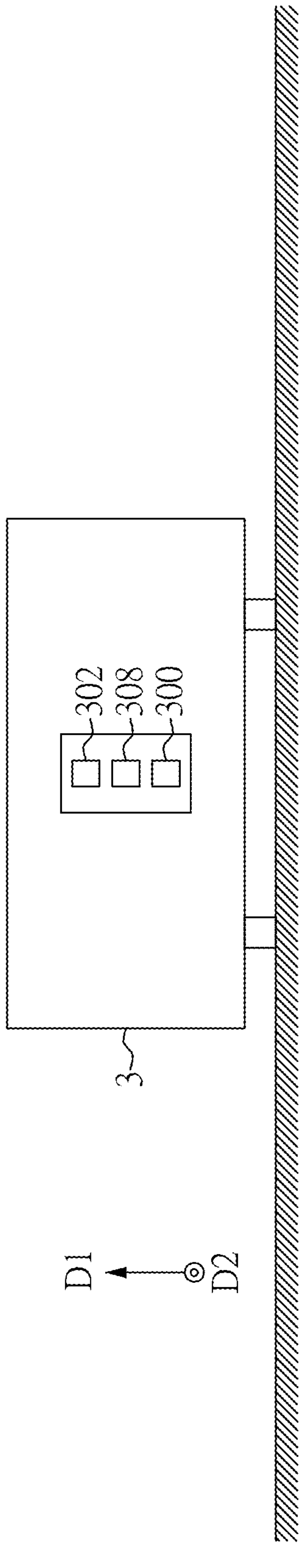
FIGS. 13 and 14 are schematic diagrams showing two different arrangements of the light source, the first light sensor and the second light sensor according to one embodiment of the present disclsoure.
Figure 14:
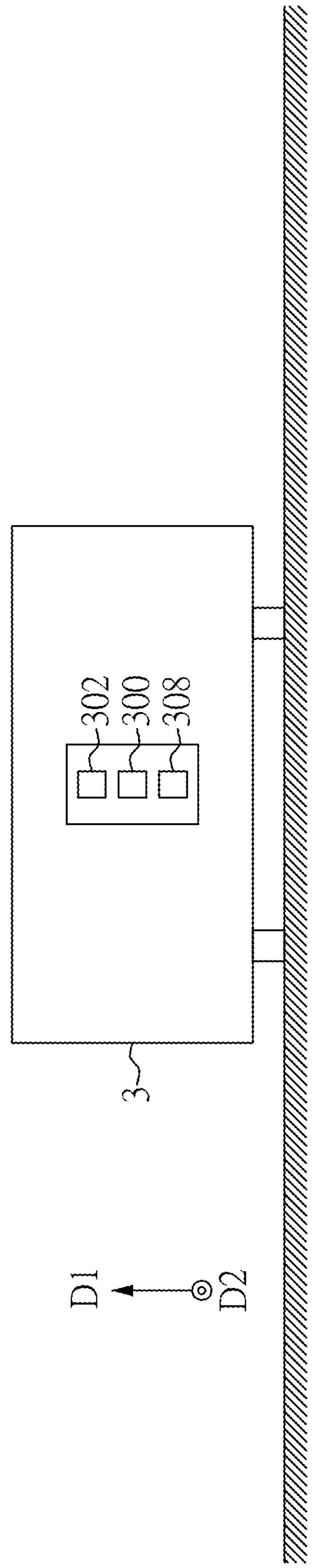

FIGS. 13 and 14 are schematic diagrams showing two different arrangements of the light source 300, the first light sensor 302 and the second light sensor 308 according to one embodiment of the present disclsoure. Referring to FIG. 13, the light source 300, the first light sensor 302 and the second light sensor 308 are arranged along a direction D1 that is perpendicular to the floor or to a direction D2 along which the detection light is emitted, and the second light sensor 308 is located between the first light sensor 302 and the light source 300. Functions of the first light sensor 302 and the second light sensor 308 may be different. For example, the first light sensor 302 disposed at a higher position can be used to determine a distance of the object, and the second light sensor 308 disposed at a lower position can be used to eliminate misjudgment caused by the reflective lights.

Referring to FIG. 14, the light source 300 is located between the first light sensor 302 and the second light sensor 308. That is, a distance between the first light sensor 302 and the second light sensor 308 shown in FIG. 14 is larger than that of FIG. 13. Therefore, positions of light patterns of multiple reflection lights obtained by the first light sensor 302 and the second light sensor 308 are quite different, such that the misjudgment caused by the reflective lights can be eliminated more effectively.

Figure 15:
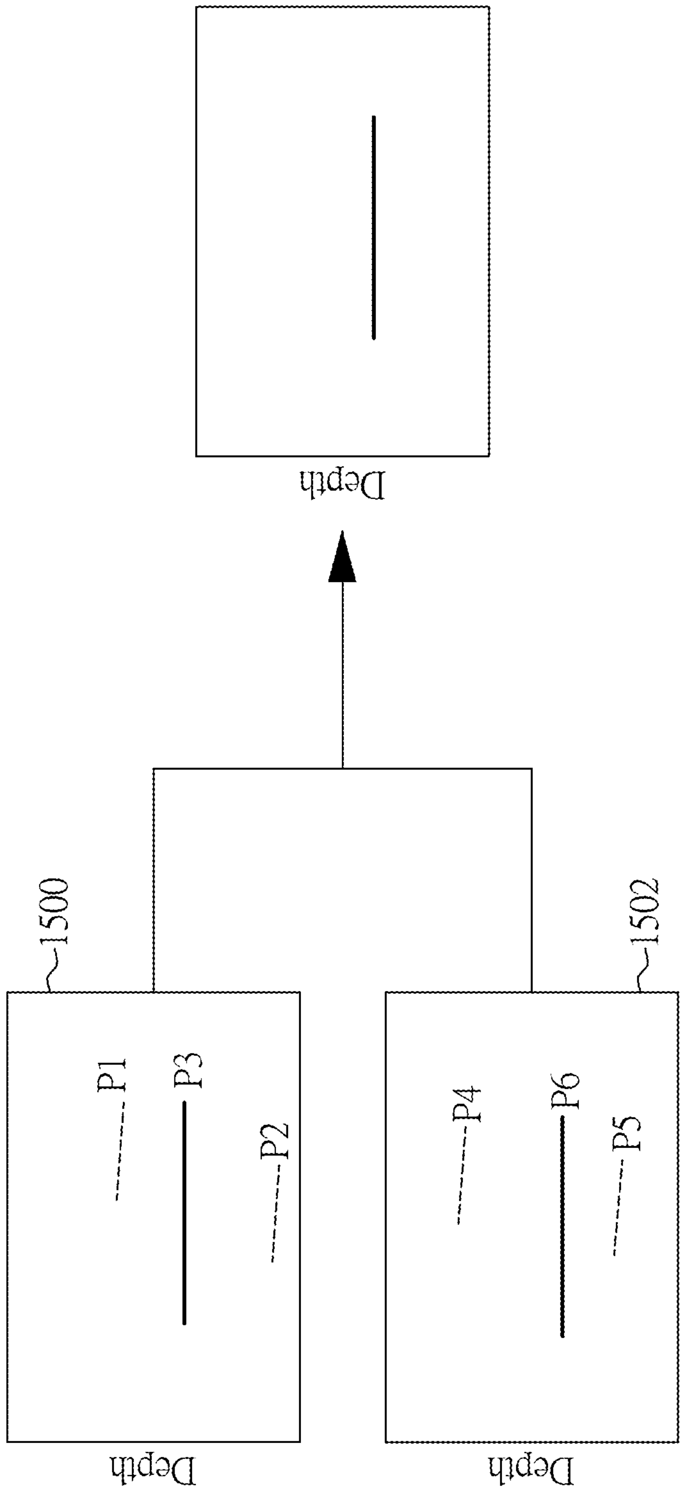
FIG. 15 is a schematic diagram showing characteristic patterns obtained from the reflected lights received by the first light sensor and the second light sensor, and a primary pattern obtained by comparing the two characteristic patterns according to one embodiment of the present disclosure.

FIG. 15 is a schematic diagram showing characteristic patterns obtained from the reflected lights received by the first light sensor and the second light sensor, and a primary pattern obtained by comparing the two characteristic patterns according to one embodiment of the present disclosure.

Reference is made to FIG. 15, the processing circuit 304 can be configured to generate a first characteristic pattern 1500 according to the reflective light signals received by the first light sensor 302, and to generate a second characteristic pattern 1502 according to the reflective light signals received by the second light sensor 308.

In detail, the first characteristic pattern 1500 includes patterns P1, P2 and P3, and the second characteristic pattern 1502 includes patterns P4, P5 and P6. By comparing the first characteristic pattern 1500 and the second characteristic pattern 1502, it can be seen that the patterns P1, P2 and P3 correspond to the patterns P4, P5 and P6, respectively. However, a distance between the patterns P3 and P6 is lesser than a distance between the patterns P1 and P4, or than a distance between the patterns P2 and P5.

Therefore, a primary pattern corresponding to a to-be-detected object can be obtained by the processing circuit 304, the primary pattern can be the pattern P3 or P6, and the obtained primary pattern can be further utilized and analyzed by the processing circuit 304, so as to obtain a distance of the to-be-detected object and achieve obstacle detection or avoidance.

Furthermore, various of light sensors can be utilized in the present disclosure. For example, the first light sensor 302 and the second light sensor 308 can both be infrared light sensors.

In some embodiment, one of the first light sensor 302 and the second light sensor 308 includes a monochromic light sensor and an infrared light sensor, and another one of the first light sensor 302 and the second light sensor 308 can be an infrared light sensor. Alternatively, each of first light sensor 302 and the second light sensor 308 can include a monochromic sensor and an infrared light sensor.

Figure 16:
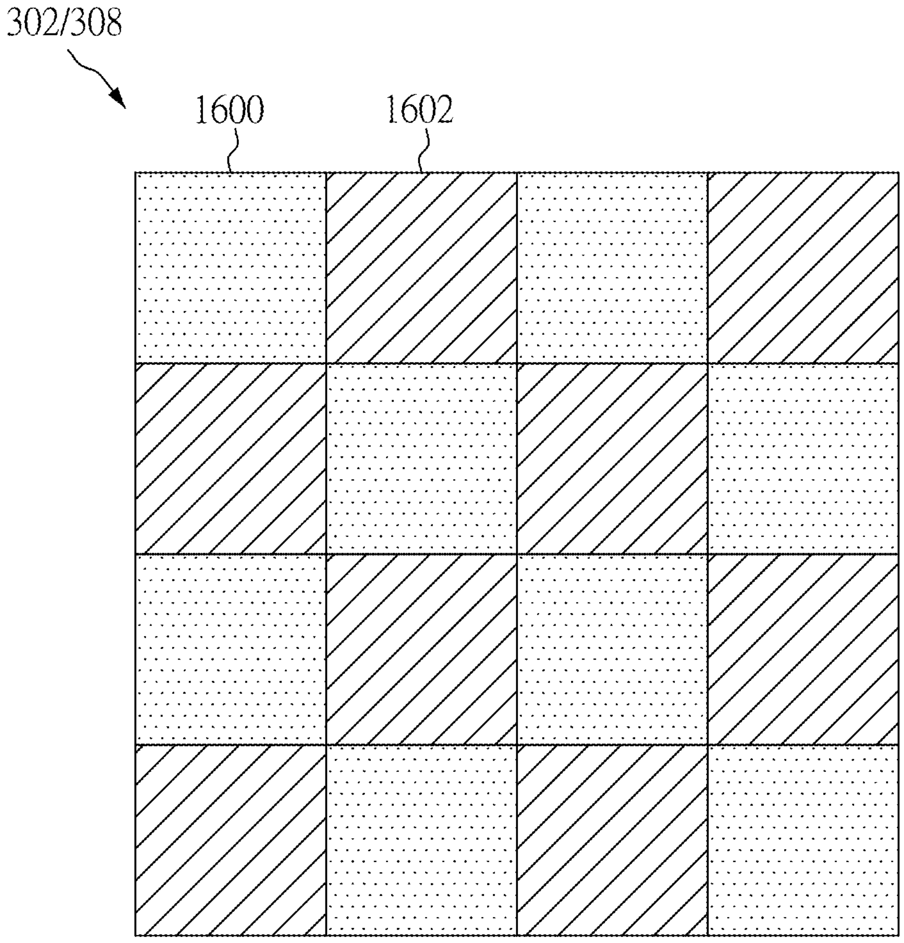
FIG. 16 is a schematic showing a stagger arrangement of the first light sensor and/or the second light sensor that includes the monochromic sensor and the infrared light sensor according to one embodiment of the present disclosure.

FIG. 16 is a schematic showing a stagger arrangement of the first light sensor and/or the second light sensor that includes the monochromic sensor and the infrared light sensor according to one embodiment of the present disclosure.

Referring to FIG. 16, in a case that the first light sensor 302 and/or the second light sensor 308 includes the monochromic sensor and the infrared light sensor, the monochromic sensor can include a plurality of first sensing elements 1600, the infrared light sensor can include a plurality of second sensing elements 1602, and the first sensing elements 1600 and the second sensing elements 1602 can be arranged in the stagger arrangement. More specifically, each of the first sensing elements 1600 is a monochromatic sensing element, and each of the second sensing element 1602 is an infrared sensing element.

In the case that one of the first light sensor 302 and the second light sensor 308 includes the monochromic light sensor and the infrared light sensor, and the other is another infrared light sensor, after distance information is obtained by comparing the characteristic patterns captured by the infrared light sensors, original data captured by the monochromatic sensor can then be used for more applications, such as object recognition, in which the type of the to-be-detected object may be further obtained.

In the case that each of the first light sensor 302 and the second light sensor 308 includes the monochromic light sensor and the infrared light sensor, after distance information is obtained by comparing the characteristic patterns captured by the infrared light sensors, original data captured by the two monochromatic sensors can then be utilized for obtaining more depth information from disparity therebetween.

It should be noted the light source 300, the first light sensor 302 and the second light sensor 308 can be additionally provided for the optical sensing system 10, so as to eliminate misjudgment caused by the reflection lights in different manners.

Beneficial Effects of the Embodiments

In conclusion, in the optical sensing system and the method for eliminating misjudgment of reflective lights sensed by the optical sensing system provided by the present disclosure, the misjudgment can be eliminated by comparing multiple sub-patterns included in a characteristic pattern obtained from reflected linear light with a reference pattern and selecting the sub-pattern that is closest to the reference pattern.

Moreover, by performing the calibration process, only a few data points need to be stored and retrieved during the process of eliminating misjudgments, instead of storing the entire image or the data of each column for the reference pattern, and the method for eliminating misjudgment of reflective lights provided by the present disclosure can be implemented without using a line-buffer or a frame-buffer.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for eliminating misjudgment of reflective lights, comprising:

emitting a detection light by a light source;

receiving reflective light signals by a light sensor; and configuring a processing circuit to:

generate a characteristic pattern according to the reflective light signals received by the light sensor;

analyze the characteristic pattern and determine whether or not the characteristic pattern includes a plurality of sub-patterns;

in response to determining that the characteristic pattern includes the plurality of sub-patterns, compare positions of the sub-patterns with a reference position of a reference pattern; and select the sub-pattern having the position that is closest to the reference position to determine whether an object is present in a detection range and eliminate misjudgment caused by the reflective lights.

2. The method according to claim 1, wherein the detection light emitted by the light source is a linear light.

3. The method according to claim 1, wherein the light sensor includes a plurality of sensor units arranged in a matrix having a plurality of columns, and the step of generating a characteristic pattern according to the reflective light signals received by the light sensor further includes:

for each column of the matrix, generating a plurality of light intensities by corresponding ones of the sensor units, obtaining at least one peak value from the light intensities, and generating a column pattern of gravity for each column of the matrix according to the at least one peak value; and combining multiple ones of the column pattern of gravity to generate the characteristic pattern.

4. The method according to claim 3, wherein the sub-patterns are each represented by a line of gravity.

5. The method according to claim 3, wherein the step of obtaining the at least one peak value from the light intensities further includes:

obtaining one of the peak value from the plurality of light intensities;

setting a predetermined range according to the obtained peak value;

determining whether another one of the peak value is present in the light intensities and is not within the predetermined range; and in response to the another one of the peak value is present in the light intensities and is not within the predetermined range, set setting the predetermined range according to the another one of the peak value and determining whether yet another one of the peak value is present in the light intensities and is not within the predetermined ranges.

6. The method according to claim 1, further comprising:

retrieving at least two reference ground points from a memory; and generating a reference ground line as the reference pattern by using a linear interpolation according to the at least two reference ground points.

7. The method according to claim 6, further comprising:

performing a calibration process to obtain the at least two reference ground points, wherein the calibration process includes:

configuring the processing circuit to:

control the light source to emit the detection light directly on a reference floor;

receive lights reflected from the reference floor by the light sensor;

generate a measured ground line according to the received lights;

extract at least two measured points from the measured ground line to serve as the at least two reference ground points; and store data of the at least two reference ground points in the memory.

8. The method according to claim 1, wherein the optical sensing system further includes an autonomous robot having a driving system, and the driving system includes:

a plurality of wheels; and a driving circuit configured to control the plurality of wheels, so as to move the autonomous robot, wherein the autonomous robot is equipped with the light source, the light sensor, and the processing circuit.

9. An optical sensing system, comprising:

a light source configured to emit a detection light;

a light sensor configured to receive reflective light signals; and a processing circuit configured to:

generate a characteristic pattern according to the reflective light signals received by the light sensor;

analyze the characteristic pattern and determine whether or not the characteristic pattern includes a plurality of sub-patterns;

in response to determining that the characteristic pattern includes the plurality of sub-patterns, compare positions of the sub-patterns with a reference position of a reference pattern; and select the sub-pattern having the position that is closest to the reference position to determine whether an object is present in a detection range while eliminating misjudgment of reflective lights.

10. The optical sensing system according to claim 9, wherein the detection light emitted by the light source is a linear light.

11. The optical sensing system according to claim 9, wherein the light sensor includes a plurality of sensor units arranged in a matrix having a plurality of columns, and the step of generating a characteristic pattern according to the reflective light signals received by the light sensor further includes:

for each column of the matrix, generating a plurality of light intensities by corresponding ones of the sensor units, obtaining at least one peak value from the light intensities, and generating a column pattern of gravity for each column of the matrix according to the at least one peak value; and combining multiple ones of the column pattern of gravity to generate the characteristic pattern.

12. The optical sensing system according to claim 11, wherein the sub-patterns are each represented by a line of gravity.

13. The optical sensing system according to claim 11, wherein the step of obtaining the at least one peak value from the light intensities further includes:

obtaining one of the peak value from the plurality of light intensities;

setting a predetermined range according to the obtained peak value;

determining whether another one of the peak value is present in the light intensities and is not within the predetermined range; and in response to the another one of the peak value is present in the light intensities and is not within the predetermined range, setting the predetermined range according to the another one of the peak value and determining whether yet another one of the peak value is present in the light intensities and is not within the predetermined ranges.

14. The optical sensing system according to claim 9, wherein the processing circuit is further configured to:

retrieve at least two reference ground points from a memory; and generate a reference ground line as the reference pattern by using a linear interpolation according to the at least two reference ground points.

15. The optical sensing system according to claim 14, wherein the processing circuit is further configured to perform a calibration process to obtain the at least two reference ground points, and the calibration process includes:

controlling the light source to emit the detection light directly on a reference floor;

receiving lights reflected from the reference floor by the light sensor;

generating a measured ground line according to the received lights;

extracting at least two measured points from the measured ground line to serve as the at least two reference ground points; and storing data of the at least two reference ground points in the memory.

16. The optical sensing system according to claim 9, further comprising:

an autonomous robot having a driving system, and the driving system includes:

a plurality of wheels; and a driving circuit configured to control the plurality of wheels, so as to move the autonomous robot, wherein the autonomous robot is equipped with the light source, the light sensor, and the processing circuit.

17. A method for eliminating misjudgment of reflective lights, comprising:

emitting a detection light by a light source;

receiving reflective light signals by a first light sensor and a second light sensor; and configuring a processing circuit to:

generate a first characteristic pattern according to the reflective light signals received by the first light sensor;

generate a second characteristic pattern according to the reflective light signals received by the second light sensor; and determine a primary pattern corresponding to a to-be-detected object by comparing the first characteristic pattern and the second characteristic pattern, so as to eliminate misjudgment caused by the reflective lights.

18. The optical sensing method according to claim 17, wherein the second light sensor is located between the first light sensor and the light source, or the light source is located between the first light sensor and the second light sensor.

19. The optical sensing method according to claim 18, wherein the first light sensor and the second light sensor are infrared light sensors.

20. The optical sensing method according to claim 18, wherein one of the first light sensor and the second light sensor includes a monochromic light sensor and a first infrared light sensor, and another one of the first light sensor and the second light sensor is a second infrared light sensor.

* * * * *